May 17, 1938.  E. E. WEMP  2,117,527
CLUTCH MEMBER
Filed Nov. 19, 1934
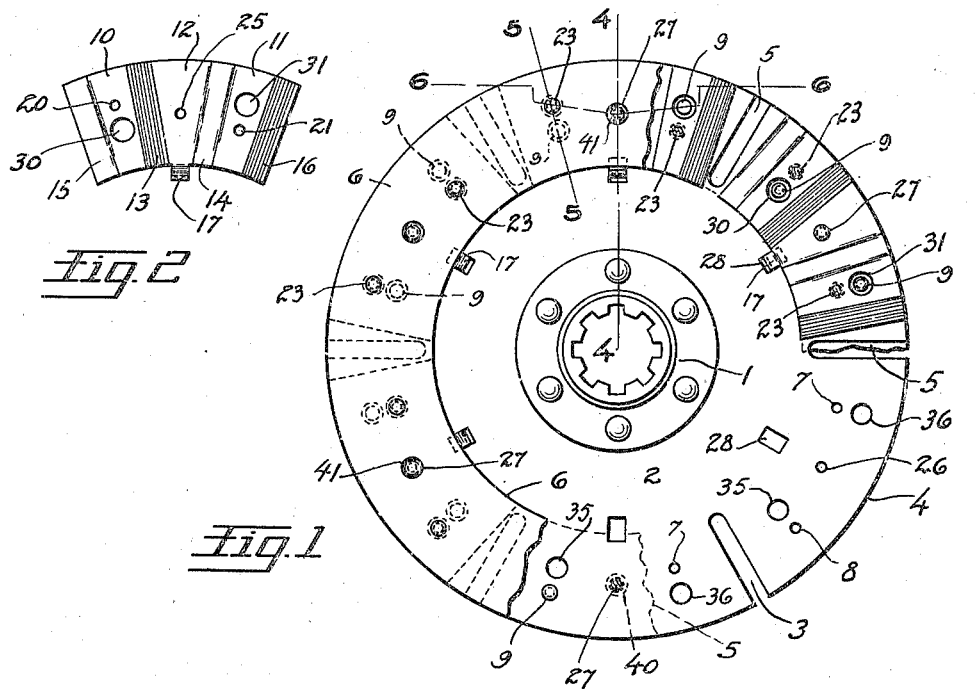
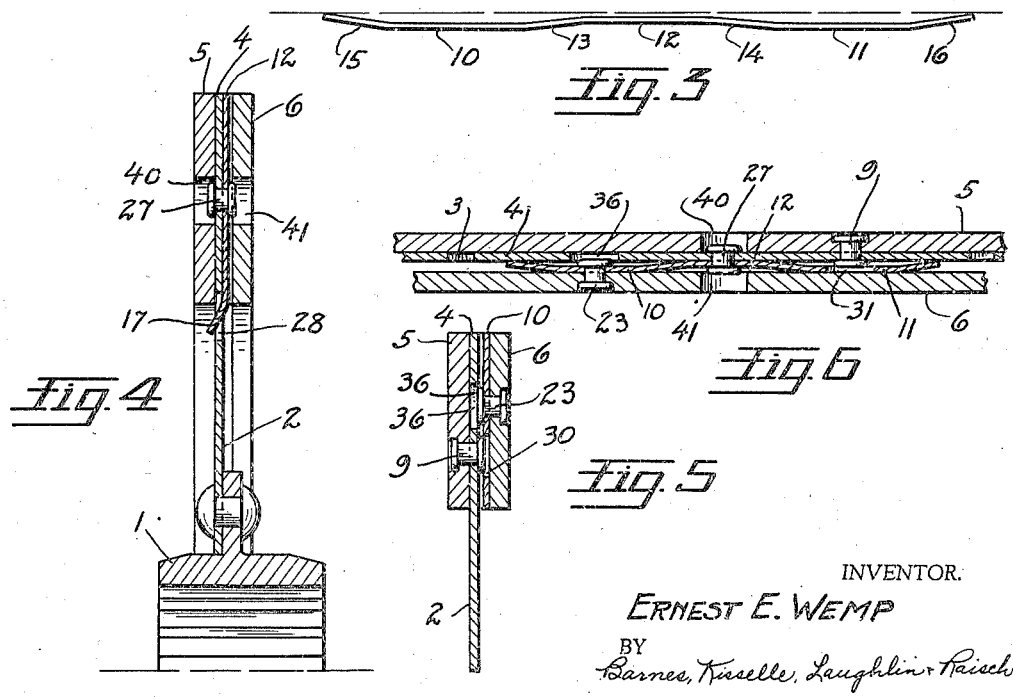
INVENTOR.
ERNEST E. WEMP
BY
Barnes, Kisselle, Laughlin & Raisch
ATTORNEYS.

Patented May 17, 1938

2,117,527

UNITED STATES PATENT OFFICE 2,117,527

CLUTCH MEMBER

Ernest E. Wemp, Detroit, Mich.

Application November 19, 1934, Serial No. 753,656

23 Claims. (Cl. 192—107)

The invention herein lies in the art of clutches, and has to do particularly with the mounting of clutch friction facings to a clutch member.

The invention may be embodied in a clutch driven disc to which friction facings are mounted. The invention aims to provide a structure which affords a soft clutch action in that there is a cushioning or compression effect provided by the facing mounting. The invention also aims to provide a construction wherein conditions may be varied to meet different requirements by merely varying or changing the nature of certain members in the construction, leaving the clutch disc structure and the facing structure without change. To these ends cushioning insert members are used and which underlie one or more of the friction facing elements. These inserts are so arranged and formed that a desired effective packing pressure may be obtained across the facings from their inner edge to their outer edge, thus to obtain a desired unit pressure at any location on the facing and to also obtain a desired torque capacity across the facings. These and other objects will become more apparent as the following detailed description progresses.

Fig. 1 is an elevational view with parts cut away illustrating a clutch driven disc in which the invention is incorporated.

Fig. 2 is a detailed view of one of the cushion insert members.

Fig. 3 is an enlarged view showing the developed form of the cushioning insert member shown herein.

Fig. 4 is an enlarged sectional view taken substantially on line 4—4 of Fig. 1 showing certain of the structures for mounting the several parts together.

Fig. 5 is an enlarged sectional view taken on line 5—5 of Fig. 1 and also showing certain structure for holding the parts assembled.

Fig. 6 is an enlarged sectional view taken substantially on line 6—6 of Fig. 1.

The clutch disc shown herein is a conventional driven disc having a hub 1 and a disc body member 2 secured thereto. So far as the present invention is concerned the disc and hub structure and the connection therebetween may vary and may incorporate a more complicated cushioning or vibration dampening structure, but the hub and disc are shown herein in perhaps the simplest form where the disc is fastened directly to the hub. The disc may have radial slots 3, thus defining segmental portions 4. This adds to the flexibility of the disc. The friction facings are shown at 5 and 6 on opposite sides of the disc 2.

The structure provides for variation in the over all thickness of the assembled driven disc measured axially through the two facings so that the facings may move toward each other under packing pressure. To this end only one facing member, as for example the facing member 6 as shown herein, may be mounted in a cushioned manner, while the facing 5 may be secured directly to the disc. For this purpose each segment 4 of the disc may be provided with apertures 7 and 8. Rivets 9 may pass through the apertures and suitable apertures in the facing 5.

The cushioning elements such as shown in Fig. 2 are positioned between the disc and facing 6. These cushioning elements may be of stamped sheet spring metal advantageously shaped as perhaps best shown in Fig. 3. The same is provided with lands 10 and 11 and a center or intermediate portion 12 joined to the lands by inclined parts 13 and 14 and having opposite edges disposed in an inclined manner as shown at 15 and 16. Preferably, the center or intermediate portion 12 lies in a plane, when the member is in normal unstressed condition, which is between the plane of the ends of the inclined portions 15 and 16 and the plane of the lands 10 and 11. Each cushioning member may be provided with an angular extending tang advantageously projecting radially inwardly and angularly.

A plurality of these cushioning members may be secured to the facing 6 with the lands 10 and 11 lying flush against the facing. For this purpose each cushioning member is provided with apertures 20 and 21 through which rivets 23 are passed. The facing 6 is secured to the disc in an indirect manner by the securing of the cushion insert members to the disc. For this purpose each cushion insert has an aperture 25. The disc has apertures 26 through which rivets 27 are passed. The tang 17 of each cushion insert is disposed in a cut-out portion 28 in the disc, and thus each insert is stabilized to the disc and held by its connection with the disc from any rocking and twisting movement on the rivet 27.

Each cushion insert is provided with enlarged clearance apertures 30 and 31 which come into alignment with the heads of the rivets 9 to clear the same, as shown in Figs. 5 and 6. The disc has clearance apertures 35 and 36 for clearing the heads of the rivets 23. The facing 5 has an aperture 40, and the facing 6 has an aperture 41, not only for clearing the heads of the rivets 27 but for assembling purposes.

In making the assembly the several spring segments may first be riveted to the facing 6, the facing 5 may be secured to the disc, and then the segments are secured to the disc by the rivets 21, with the tangs 17 disposed in the apertures to complete the assembly. Due to the fact that the intermediate portion 12 lies in a plane between the planes of the lands 10 and 11 and the ends of the inclined ends 15 and 16 the spring segments are tensioned upon the tightening of the rivets 27, thus insuring a tight, secure assembly.

It is, of course, appreciated that this disc is to be packed between other clutch members, as for example driving members, with packing pressure, which pressure collapses or tends to substantially collapse the several spring segments. The holes in the facing 6 for the rivets 23 may be oversize to permit of extension movement when the cushion members are flattened. This movement is very small, and a clearance of .002 or .003 of an inch will suffice. The torque capacity is determined by multiplying the effective packing pressure, the coefficient of friction and the radius. Where the facing material is such that the coefficient of friction is a constant factor, the torque capacity obviously varies across the facings from their inner peripheral edges to their outer peripheral edges where the pressure across the facings is uniform. By properly forming the segments, less effective pressure may be obtained at the outer peripheral edges than at the inner peripheral edges, and this may be coordinated with the differential radii to produce uniform torque capacity across the facings radially. For example, if the spring inserts collapse more easily near their outer edges than they do at their inner edges then the effective packing pressure is less at the outer edge than at the inner edge. This may be varied as desired by merely changing the formation, structure or strength of the spring segments without disturbing the nature of the facings of the disc. It has been found in some cases that it is best to so construct the disc that the torque capacity is not uniform across the facings, and one example may be mentioned wherein the pressure required to collapse the segments at their inner portions was such that the effective packing pressure at the inner peripheral edges of the facings was 10 to 15% less than that required to produce a torque capacity equal to the torque capacity at the outer peripheral edges. This is merely an example to emphasize how changes and variations may be made by merely varying the inserts. The facing are preferably of a relatively rigid load-supporting molded type of facing so as to withstand packing pressure where the same bridges the lands 10 and 11 of the same segment or bridges the lands between adjacent segments, so that there is a substantially uniform pressure with resultant uniform torque capacity throughout the circumferential extent of the facings on any given radius from their inner peripheral edge to their outer peripheral edge.

In some of the claims appended hereto, the cushion members are termed "segmental members". This is intended to describe a structure where a plurality of such members are arranged in an annulus, and is to be broadly construed even though the shape of the cushion members may not be truly segmental.

The terms "center" and "central" as applied to the portion 12 are not used in a limited sense as something exactly upon a center point; this term is used broadly in the sense that the portion 12 is an intermediate or middle portion of the member.

I claim:

1. In a clutch member having a disc body and a facing ring, a plurality of cushion members disposed between the disc body and the facing ring, each cushion member being fashioned to provide an intermediate portion for engagement with the disc, and opposite edge portions for engagement with the disc, and two portions between the said intermediate portion and opposite edges and out of the plane of said intermediate portion for engagement with the facing ring, whereby the disc and facing ring are held spaced apart, said members being of spring metal and being adapted to substantially collapse under packing pressure.

2. In a clutch member having a disc body and a facing ring, a plurality of cushion members disposed between the disc body and the facing ring, each cushion member being of sheet spring metal and fashioned to provide an intermediate portion for engagement with the disc, parts on opposite sides of the intermediate portion and removed from the plane of the center portion for engagement with the facing ring and opposite edges for engagement with the disc, whereby the disc and facing ring are held resiliently spaced apart, means securing each cushion member to the facing ring, and means securing each cushion member to the disc, said cushion members being adapted to substantially collapse under packing pressure.

3. In a clutch member, a disc, a clutch facing element, a substantially segmentally shaped cushion member between the disc and facing element, said member having an intermediate portion and opposite edges for contact with the disc and lands one on each side of the intermediate portion for contact with the facing element, with the intermediate portion and lands extending substantially from the inner edge to the outer edge of the cushion member, said edges and intermediate portion being joined to the lands by inclined parts, whereby the disc and facing element are held spaced apart, said member being of spring material and adapted to substantially collapse under packing pressure.

4. In a clutch member, a disc, a clutch facing element, a substantially segmentally shaped cushion member between the disc and facing element, said member having a center portion and opposite edges for contact with the disc, and lands one on each side of the center portion for contact with the facing element, with the center portion and lands extending substantially from the inner to the outer edge of the cushion member, said edges and center portion being joined to the lands by inclined parts, whereby the disc and facing element are held spaced apart, said member being of spring material and adapted to substantially collapse under packing pressure, means securing the center portion of said member to the disc, and means securing the lands to the facing element.

5. In a clutch member, a disc, a facing element, a cushion member of wavy spring metal between the disc and facing element, with the waves extending substantially from the inner to the outer edges of the member, means securing the cushion member to the facing element substantially at the crest of a wave which is in contact with the facing element, and means securing the cushion member to the disc substantially at the crest of a wave in contact with the disc, said cushion member being adapted to substantially collapse under packing pressure.

6. In a clutch member, a disc, a facing element, a cushion member of wavy spring metal between the disc and facing element, with the waves extending substantially from the inner to the outer edge of the member, means securing the cushion member to the facing element substantially at the crest of a wave which is in contact with the facing element, and means securing the cushion member to the disc substantially at the crest of a wave in contact with the disc, said member being adapted to substantially collapse under packing pressure, said securing means being in the form of rivets and said disc having clearance holes for the heads of the rivets which secure the cushion member to the facing element.

7. A clutch member comprising, a disc, a facing riveted to one side thereof, a plurality of segmental cushion members each of wavy formation and of spring metal disposed on the opposite side of the disc and with the waves extending substantially from the inner to the outer edges of the cushion members, another facing element, rivets securing the second facing element to the several cushion members, rivets securing each of the several cushion members to the disc, said cushion member having clearance apertures for the rivets in the first facing and the disc, and said disc having clearance apertures for the rivets between the cushion members and the second facing element, and each facing element having an aperture for clearing the rivets connecting the cushion members and the disc.

8. A clutch member comprising, a disc, a facing element on opposite sides thereof, a plurality of spring metal wavy cushion members between the disc and one facing element, means securing each cushion member to the disc comprising a tang on each member, the disc having an aperture for the reception of each tang.

9. A clutch member comprising, a disc, a facing element on opposite sides thereof, a plurality of spring metal wavy cushion members between the disc and one facing element, means securing each cushion member to the disc comprising a tang on each cushion member, the disc having an aperture for the reception of each tang, and means securing the facing element overlying the cushion members to the several cushion members.

10. A clutch member comprising, a disc, a facing element on opposite sides thereof, a plurality of spring metal cushion members between the disc and one facing element, rivets for securing each cushion member to the disc, the disc having a plurality of apertures therein, and an angularly extending tang on each cushion member and projecting into one of the apertures.

11. A cushion member adapted to be disposed between and secured to the disc body of a clutch member and the clutch facing element comprising, a substantially segmentally shaped spring metal body having lands extending substantially from its inner edge to its outer edge for contact with the facing element, and an intermediate portion and end portions disposed in planes removed from the lands for contact with the disc body.

12. A cushion member adapted to be disposed between and secured to the disc body of a clutch member and the clutch facing element comprising, a substantially segmentally shaped spring metal body having lands extending substantially from its inner edge to its outer edge for contact with the facing element, and an intermediate portion and end portions disposed in planes removed from the lands for contact with the disc body, and a tang projecting from the cushion member for association with a disc body.

13. A cushion member adapted to be disposed between and secured to the disc body element and the facing element of a clutch member comprising, a substantially segmentally shaped spring metal body having lands extending substantially from its inner edge to its outer edge and having an intermediate portion and end portions disposed in planes removed from the lands, said lands adapted for contact with one of said elements, and the intermediate portion and end portions adapted for contact with the other of said elements.

14. In a clutch member having a disc body element and a facing ring element, a plurality of cushion members disposed between the disc body element and the facing ring element, each cushion member being fashioned to provide an intermediate portion and opposite edge portions which lie substantially in the same plane, and two portions between said intermediate portion and the opposite edge portions lying in a plane removed from the plane of the intermediate portion and edge portions, the said intermediate portion and edge portions being in substantial engagement with one of said elements and the said two portions in substantial engagement with the other of said elements, whereby the disc body element and facing ring element are held spaced apart, said cushion members being of spring metal and adapted to substantially collapse under clutch packing pressure.

15. A clutch structure comprising, a disc member, clutch facing means carried thereby, spring metal cushion members interposed between portions of the disc member and the facing means, securing means passing through each cushion member in a zone thereof which underlies a facing means and through the disc member for securing each cushion member in place between the disc member and the facing means and an angularly disposed tang on one member and an aperture in the other for receiving the tang for holding the cushion member from rotating on the securing means.

16. A clutch structure comprising, a disc member, clutch facing means carried thereby, spring metal cushion members interposed between portions of the disc member and the facing means, securing means passing through a central portion of each cushion member and the disc member, and means for holding each cushion member from turning on said securing means comprising an angularly disposed tang integral on one member and an aperture in the other member for receiving the tang.

17. A clutch member comprising, a single disc, a facing member on each side of the disc near its outer periphery and carried by said disc, a plurality of individual spring metal cushion members arranged in an annulus and disposed between the disc and one facing member, each of said cushion members being fashioned to provide a part in its intermediate section for lying against the disc, and spaced parts, one on each side of the first mentioned part for lying against the said one facing member and in planes removed from the plane of the first mentioned part for holding the disc and said one facing member resiliently spaced apart, and securing means passing through the disc and the first mentioned part of each cushion member, the said one facing member having a clearance aperture therein in substantial alignment with each of said securing means into which the securing means may project when the cushion members are substantially collapsed.

18. In a clutch disc, a hub member, a substantially circular relatively non-yielding plate disposed on, and concentric to said hub member, an annular friction facing located concentrically of said plate and hub assembly and parallel with the plane of the body of the plate, and a plurality of structurally independent relatively light spring steel cushion members forming the sole supporting and interconnecting means for said facing relative to said plate, said cushion members being so arranged relative to said plate and to said facing as to transmit torque non-yieldingly from said facing to said plate and to yieldingly resist lateral movement of the facing in the direction of the plane of the body of the plate, as during compression of the clutch disc.

19. In a clutch disc, a hub member, a substantially circular relatively non-yielding plate disposed on, and concentric to said hub member, an annular friction facing located concentrically of said plate and hub assembly and parallel with the plane of the body of the plate, and a plurality of structurally independent relatively light spring steel cushion members arranged in end to end annular array about the axis of said plate and hub assembly and forming the sole supporting and interconnecting means for and between said friction facing and said plate and hub assembly, said cushion members being fixed at one portion thereof to said plate and at another portion to said facing and each being curved in cross section, the arrangement between said cushion members, said plate and said facing being such as to transmit torque non-yieldingly from said facing to said plate but to yieldingly oppose bodily lateral movement of the facing in the direction of the plane of the body of the plate as during compression of the clutch disc.

20. In a clutch driven member, a hub, a disc member secured to the hub, a friction facing member, a plurality of steel spring cushion members, means securing the cushion members to the disc body member adjacent the outer portion of the disc member, said cushion members being of wavy form to provide circumferentially spaced lands for the facing element and which lands are axially removed from the center plane of the disc member, and means connecting the facing element to the spring cushion members, whereby torque transmitting connections are established from the facing element, through the cushion members and disc member, to the hub, said cushion members adapted to substantially collapse under pressure to cushion clutching action.

21. In a clutch driven member, a hub, a disc member secured to the hub, a friction facing member, a plurality of steel spring cushion members, means securing the cushion members to the disc body member adjacent the outer portion of the disc member, said cushion members being of wavy form to provide circumferentially spaced lands for the facing element and which lands are axially removed from the center plane of the disc member and substantially parallel to the plane of the disc, and means connecting the facing element to the spring cushion members, whereby torque transmitting connections are established from the facing element through the cushion members and disc member, to the hub, said cushion members adapted to substantially collapse under pressure to cushion clutching action.

22. A clutch driven member adapted to be packed between clutch driving members comprising, a hub, a disc member secured to the hub, a plurality of steel spring cushion members, the stock of which is relatively thin as compared to the disc member, means securing the cushion members to the disc member adjacent the outer zone of the disc member, said cushion members being of wavy form, two friction facing elements between which the cushion members lie and which are yieldingly held in axially spaced relation by said cushion members, means connecting the facing elements in torque transmitting relation to the disc member including means connecting at least one facing element to the spring cushion members, whereby torque transmitting driving connections are established from said one facing element, through the cushion members and disc member, to the hub, said cushion members adapted to substantially collapse when the facing elements are packed under pressure between clutch driving members.

23. A clutch driven member adapted to be packed between clutch driving members comprising, a hub, a disc member secured to the hub, a plurality of separate steel spring cushion members, means securing the cushion members in driving relation to the disc member adjacent the outer zone of the disc member, two friction facing elements between which the cushion members lie, said cushion members having a wavy formation to provide circumferentially spaced lands for contact with one facing element, and said lands extending substantially across the one facing radially in contact therewith, means securing the facing elements in torque transmitting relation with the disc member including means connecting at least one facing to the spring cushion members, whereby torque transmitting driving connections are established from said one facing element, through the cushion members and disc member, to the hub, said cushion members adapted to substantially collapse when the facing elements are packed under pressure between clutch driving members.

ERNEST E. WEMP.